(No Model.)

J. TYM.
ANT HILL CUTTER.

No. 473,799. Patented Apr. 26, 1892.

WITNESSES:
Fred G. Dieterich
P. B. Turpin

INVENTOR:
John Tym.
BY
ATTORNEYS

UNITED STATES PATENT OFFICE.

JOHN TYM, OF NORTH BEND, NEBRASKA.

ANT-HILL CUTTER.

SPECIFICATION forming part of Letters Patent No. 473,799, dated April 26, 1892.

Application filed July 8, 1891. Serial No. 398,860. (No model.)

*To all whom it may concern:*

Be it known that I, JOHN TYM, of North Bend, in the county of Dodge and State of Nebraska, have invented a certain new and useful Improvement in Ant-Hill Cutters, of which the following is a specification.

This invention is an ant-hill cutter; and it consists in certain features of construction and novel combinations of parts, as will be hereinafter described, and pointed out in the claims.

Figure 1:
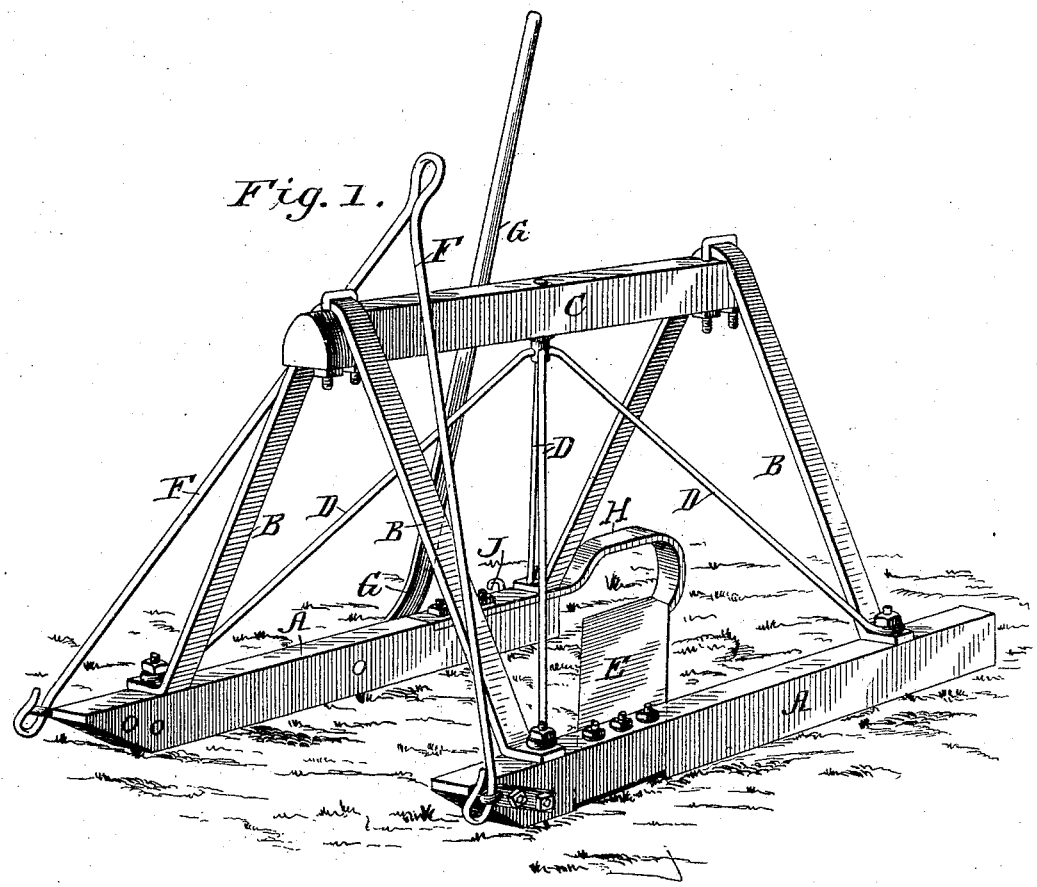
Figure 2:
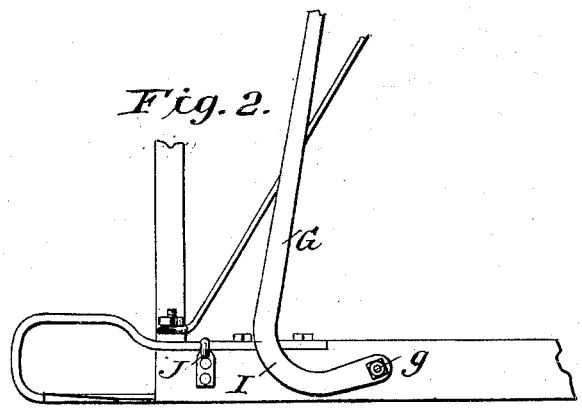

In the drawings, Figure 1 is a perspective view of my improved machine, and Fig. 2 is a detail view.

The machine is formed with side runners A A, front and rear arches B B, top beam C, brace-arms D, cutter E, draft-bail F, and the adjusting-lever G, with its runner, for holding the cutter clear of the ground. The top beam is clipped to the arches, and the brace-rods are bolted with the ends of the arches to the runners and cross just below the center of the top beam and are bolted thereto. The draft-bail F is provided at its ends with hooks, which engage in eyes secured at the front ends of the runners and in a plane with the under surface thereof, so that as the machine is moved over the ground the cutter will cut off the ant-hill level with the surface thereof. At its rear end the cutter projects in rear of the adjacent side runner to afford exit for sod, trash, and the like, and it is connected with and braced from said runner by the metal bar H, extending from the top of the rear end of said runner back above the cutter and then down and bolted thereto, as shown. In securing the arrangement of the cutter in rear of the runner, as described, it is preferred to make one runner shorter than the other, as shown.

In operation, as the machine is dragged over the ground, usually by horse-power, the cutter will strip the ant-hills off close to the ground-surface, when they can be readily removed and the ground be left in condition for cultivation. The adjusting-lever G is pivoted at *g* to one of the runners and has a runner-like portion I, which when the lever is depressed projects below the surface of the said runner and lifts the same clear of the ground, so as to hold the cutter off the ground in moving the machine from place to place. When depressed, the lever is held by a hook J, as shown, or other suitable fastening, as may be desired.

Having thus fully described my invention, what I claim is—

1. An ant-hill cutter comprising the frame having the side runners, the cutter arranged obliquely to and secured at its front end to one of the runners and arranged and adapted at its rear end to permit trash and the like to pass off, and a connection between said end of the cutter and the other runner, all substantially as set forth.

2. An improved ant-hill cutter comprising the side runners, the cutter connected therewith, the end arches, the top beam connected with and extended between said arches, and the brace-rods connected at their ends with the runners and centrally between their ends with the top beam, substantially as set forth.

3. The improved ant-hill cutter consisting of the runners A A, the end arches, the top beam secured to and extended between said arches, the brace-rods connected at their ends with the runners and centrally between their ends to the top beam, the cutter secured to one runner and extended obliquely to a point in rear of the other runner, the bar connecting said end of the cutter with such runner, the lever pivoted to one of the runners and having a runner portion arranged to project below such runner when the lever is depressed, and a fastening by which the lever may be held depressed, substantially as set forth.

JOHN TYM.

Witnesses:
JOHN CUSACK,
F. M. DORSEY.